United States Patent

Yamamori

[11] 4,057,382
[45] Nov. 8, 1977

[54] APPARATUS FOR AIR-PRESSURE FORMING THERMOPLASTIC RESIN SHEETS

[75] Inventor: Masaji Yamamori, Nagoya, Japan

[73] Assignee: Mitsubishi Monsanto Kasei Kabushiki Kaisha, Tokyo, Japan

[21] Appl. No.: 600,029

[22] Filed: July 29, 1975

[30] Foreign Application Priority Data

Aug. 5, 1974 Japan .................................. 49-89611

[51] Int. Cl.² ............................................. B29C 17/04
[52] U.S. Cl. .................................... 425/387.1; 264/93
[58] Field of Search ................... 425/387 R, 388, 405, 425/342; 264/93

[56] References Cited

U.S. PATENT DOCUMENTS

| | | | |
|---|---|---|---|
| 910,735 | 1/1909 | Sill | 425/387 R |
| 1,963,013 | 6/1934 | Breth | 425/387 X |
| 2,850,966 | 9/1958 | Dohm, Jr. | 100/232 |
| 3,740,182 | 6/1973 | Wunning | 425/387 |
| 3,933,562 | 1/1976 | Cruckshank et al. | 425/387 R X |

*Primary Examiner*—Robert L. Spicer, Jr.
*Attorney, Agent, or Firm*—Ladas, Parry, Von Gehr, Goldsmith & Deschamps

[57] ABSTRACT

A method of and an apparatus for air-pressure forming of a sheet of thermoplastic resin wherein a sheet of thermoplastic resin is formed to a desired shape under a substantially constant controlled air pressure. The apparatus includes a compressed air generating device comprising an air cylinder having a first piston slidable therewithin, a hydraulic cylinder having a second piston slidable therewithin and connected mechanically to the first piston, whereby compressed air pressure produced by the first piston balances with hydraulic pressure so as to be maintained at a substantially constant level during the whole forming operation.

7 Claims, 2 Drawing Figures

APPARATUS FOR AIR-PRESSURE FORMING THERMOPLASTIC RESIN SHEETS

BACKGROUND OF THE INVENTION

The present invention relates in general to air-pressure forming of sheets of thermoplastic resin and particularly to a method of and an apparatus for carrying out air-pressure forming under an air pressure controlled at a substantially constant level.

There are known a variety of methods of producing from a sheet of thermoplastic resin material products of various shapes such as containers for ices and beverages, containers for food products, etc., such as vacuum forming, air-pressure forming, combination process thereof, mechanical molding, etc. However, these known methods and the apparatuses therefor are inherently accompanied by such technical and economical problems as follows.

1. Considerably costly equipment such as a vacuum pump, its accessory devices, a compression pump, its accessory devices, and the like are required.
2. These vacuum pumps and compression pumps are liable to produce considerably noises that cause a serious impairment of the work environment.
3. Such electrically-operated devices as solenoid valve, relays, timers, and many others, are essentially required and are likely to cause trouble particularly when a molding operation cycle is cut short.
4. Pipings from such vacuum and compression pumps to the forming station become longer, thus resulting in substantial power losses.
5. When compressed air required in performing a forming operation flows through the piping, time losses are incurred. Consequently, it becomes difficult to continuously perform forming operations at a high production rate and with a large quantity of products.

In this respect, an air-pressure forming apparatus as a countermeasure to such problems has been proposed and disclosed in Japanese Patent Publication No. 14492/1963. This apparatus comprises a cylinder having a piston therein arranged slidably toward and away from a master disc set on the base of the apparatus, thereby applying a pressure upon the back side of a sheet of material to be formed with lowering or compressing motion of the piston in the cylinder, thus forming a disc surface under pressure. However, when this apparatus is used in forming operations, it is impossible to apply a pressure to the material sufficient to effect a proper forming during the initial stage of compression by the piston due to a relatively slow initial pressure rise, whereby the pressure rising within the cylinder becomes highest when the piston comes down to its lowest position or end of compression stroke. Consequently, there is the possibility of the formed products turning out to be of inferior quality.

In order to overcome this problem, a pressure forming method has been proposed and disclosed in the Japanese Patent Laid-Open No. 44074/1974, in which the following problems cannot be avoided.

1. Variation in forming pressure occurs with changes of the volume of the material to be formed.
2. A forming pressure variation occurs between the initial forming stage and the middle and end stages where the formed products are subjected to cooling under pressure.
3. Pulsation in forming pressure occurs as a result of the reciprocating motion of the piston for compression action.
4. Leakage of compressed air occurs when there is a difference in the thickness of a material to be formed, therefore requiring make-up of compressed air.

In this respect, it would be advantageous if an improved method and apparatus were to be provided to overcome the above described problems. This invention is essentially intended to provide a useful method of forming a sheet of thermoplastic resin and an apparatus therefor, whereby a hot forming method and an apparatus therefor are attained which can overcome all of the problems stated above.

SUMMARY OF THE INVENTION

It is therefore a primary object of this invention to provide an improved method of air-pressure forming wherein a thermoplastic resin in the form of a continuous web or sheet is formed to a desired shape under air pressure which is produced and maintained at a substantially constant controlled level by using a single or a plurality of pneumatic cylinders for making-up the quantity of air lost during the forming operation.

According to this invention in a preferred embodiment thereof, briefly summarized, there is provided an improved method of air-pressure forming including the steps of disposing mold means having a plurality of air purging holes and complementary means having a plurality of compressed air blowing holes in an opposing relationship in such a manner that relative positions of the mold means and the complementary means can be relatively changed toward and away from each other, positioning a sheet of preheated thermoplastic resin between the mold means and the complementary means, thereafter causing the mold means and complementary means to be in a clamping position with the sheet of resin being sandwiched therebetween, and supplying the sheet with compressed air from the blowing holes of the complementary means, the improvement which comprises the steps of generating a substantially constant air pressure by a single or a plurality of air compressing means comprising a pneumatic cylinder having a first piston movable slidably therein, a hydraulic cylinder having a second piston movable slidably therein and mechanically connected to the first piston, forming the sheet of resin to a desired shape while supplying the second piston with a substantially constant hydraulic pressure, thereby maintaining an air pressure to be supplied to the sheet of resin at a level to substantially balance with the hydraulic pressure, thereafter releasing both mold means and complementary means away from the sheet so as to obtain a formed product.

According to the invention, briefly summarized, there is also provided an improved apparatus comprising a set of mold means having a plurality of air purging holes and complementary means having a plurality of compressed air blowing holes, and an air compressing means, the set of mold means and complementary means being disposed opposingly in such a manner that at least one of the means may be moved toward and away from the other thereof, the improvement wherein the air compressing means comprises compressed air generating cylinder means, first piston means movable slidably within the compressed air generating cylinder means, hydraulic cylinder means, and second piston means movable slidably in the hydraulic cylinder means, the first piston means being mechanically connected to the second piston means.

The nature, principle, and details of the present invention, as well as further objects and advantageous features thereof, will become more apparent from the following detailed description with respect to a preferred embodiment of the invention, when read in conjunction with the accompanying drawings, in which like parts are designated by like reference numerals.

DETAILED DESCRIPTION

The construction and operation of an air-pressure forming apparatus according to this invention will now be described in detail with respect to a preferred embodiment thereof in conjunction with the accompanying drawings. It should be understood, however, that the embodiment of the invention appearing herein are presented for illustrative purpose only and not in any way for limitations of the scope and spirit of the invention.

Figure 1:
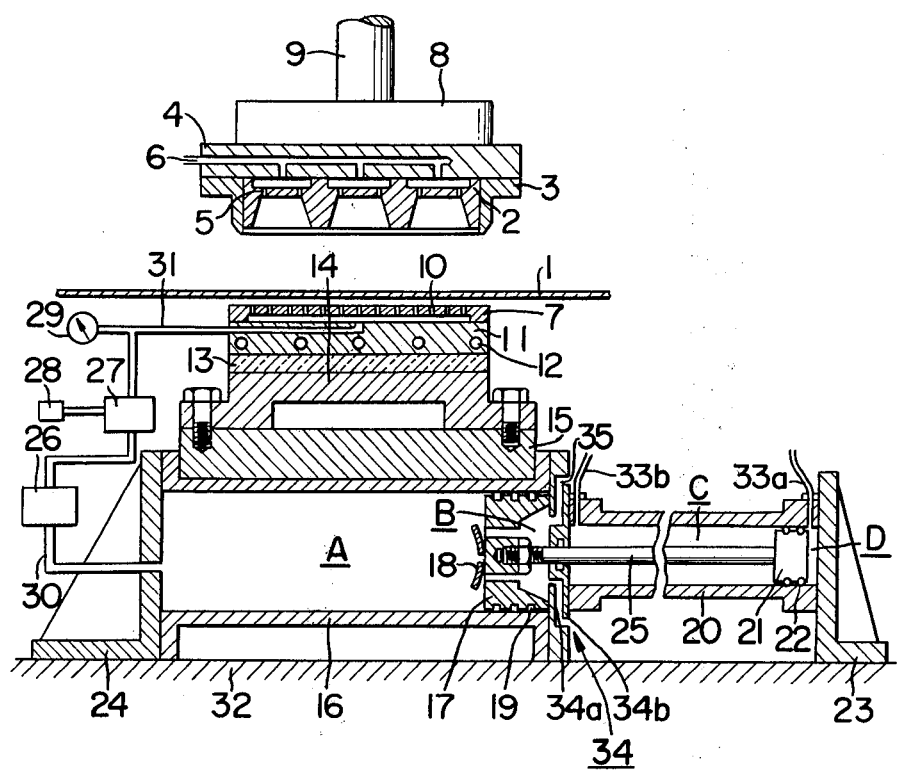
FIG. 1 is a schematic elevation, in vertical section, showing an example of an apparatus for practicing the air-pressure forming method according to the present invention.

The apparatus illustrated in vertical section in FIG. 1 is an example of suitable means for practicing the method according to the present invention.

Referring to FIG. 1, there is shown a thermoplastic resin 1 in the form of a continuous web or sheet to be formed under air pressure, which sheet is preheated by using heating means (not shown) and is fed by a sheet feeding device (not shown) through a predetermined distance of travel so that it will be positioned in the pressure-forming station of the apparatus. For the heating means, any one or combination of such known heating processes as hot blast heating, infrared ray heating, and roll heating can be used. For the sheet feeding means, a normal intermittent feeding system such as a geneva movement, a rack mechanism, and a one-cyclone motor can be used.

In the overhead part of the apparatus shown in FIG. 1, above the resin sheet 1, there are provided a mold 2 of any desired shape, a mold frame 3 for holding the mold 2 in position, a mold support 4, air exhaust holes 5 provided in each cavity of the mold 2, an exhaust outlet 6 for discharging air from the exhaust holes to the atmosphere, a clamping plate 8, and a clamping rod 9. The clamping rod 9 is adapted to be moved vertically by a hydraulic cylinder or a toggle mechanism (not shown). In the part of the apparatus below the resin sheet 1 and vertically aligned with the overhead part, there are provided a complementary plate or air blowing plate 7 having a plurality of exhaust holes 10, a hot plate 11, a hot plate heater 12, an insulator 13, a hot plate support 14, and a fixing base 15.

In addition, there are provided a compressed air generating cylinder 16, referred to hereinafter as air cylinder, and a hydraulic actuating cylinder 20 referred to hereinafter as oil cylinder, which cylinders are disposed opposingly in coaxial relationship across a partition wall 34 comprising end plates 34a and 34b. A piston 17 movable slidably in the air cylinder 16 is provided so as to generate an air pressure within the air cylinder 16, the piston 17 being connected to a piston 21 movable slidably within the oil cylinder 20 by a rigid piston rod 25 extending through the partition wall 34. The term "compressed air generating device" is used herein to mean the combination comprising the air cylinder 16, the piston 17, the oil cylinder 20, the piston 21 and the piston rod 25.

Inside the compressed air generating device stated above, there are defined a compression chamber A and an air intake chamber B on opposite sides of the piston 17, and oil chambers C and D on opposite sides of the piston 21. The piston 17 is provided with a plurality of piston rings 19 and a plurality of non-return or check valves 18 preventing flow of air from the chamber A to the chamber B. The chamber B communicates with the atmosphere through a space between the end plates 34a and 34b and an air inlet 35. The non-return valves 18 may be an ordinary check valve such as a flap valve, which opens when the piston 17 moves toward the partition wall 34 and closes when the piston 17 moves away from the partition wall. The piston 21 has piston rings 22.

Figure 2:
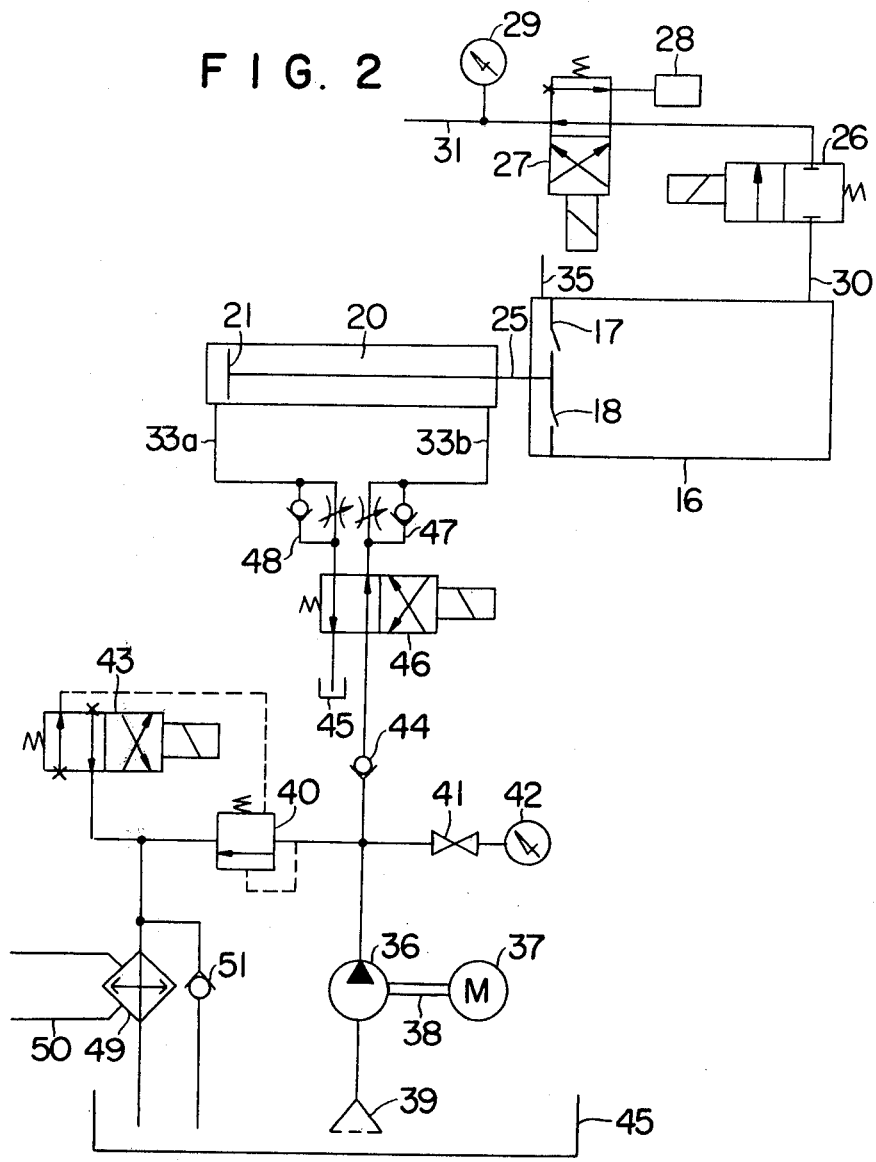
FIG. 2 is a schematic diagram showing an example of hydraulic and pneumatic circuits used in combination with the apparatus shown in FIG. 1.

A bracket 23 supports the outer end of the oil cylinder 20, and a bracket 24 supports the outer end of the air cylinder 16 and forms the outer end head wall thereof. A port in this outer end head wall of the air cylinder 16 is connected by way of an air pipe line 30, a valve 26 for starting the forming operation, an exhaust valve 27 provided with a silencer 28, and an air pipe line 31 provided with a forming pressure gage 29 to a manifold chamber at the lower part of the aforementioned air blowing plate 7. The apparatus is mounted on a foundation 32. The above mentioned oil chambers D and C are respectively supplied with hydraulic (oil) pressure through hydraulic pipe lines 33a and 33b connected to a known hydraulic pressure generating device as shown in FIG. 2 comprising a hydraulic pump, a release valve, switching valves, etc., as described hereinafter.

In an apparatus for practicing the method according to this invention, there are disposed opposingly the mold 2 and the air blowing plate 7 in such a manner that one of these elements can be moved toward (for mold clamping) and away from (for mold releasing) the other. For this purpose, in one example of arrangement, there are provided a plurality of guide posts disposed upright between the mold frame 3 and the fixing base 15. A plurality of exhaust holes 5 are provided in each cavity of the mold 2 for discharging air remaining within the cavities of the mold 2 during the forming operation. These exhaust holes 5 are collectively connected to the exhaust outlet 6, which may be connected to a vacuum pump (not shown) operating interrelatedly with the forming stroke so as to exhaust air out of the mold cavities, and the exhaust outlet 6 may also be connected to a compressed air supply (not shown) for mold releasing. For this purpose, the compressed air supply may be the compressed air discharged from the exhaust valve 27.

A large number of exhaust holes 10 are provided in the air blowing plate 7, which is connected through the air pipelines 30 and 31 to the above mentioned compressed air generating device including the air cylinder 16 and the piston 17. In FIG. 1, although the compressed air generating device is shown disposed under the fixing base 15, by way of an example, this compressed air generating device may, of course, be disposed in other positions. Likewise, it is of course possible to alternatively replace the hydraulic (oil) actuating system including the oil cylinder as stated above with water pressure actuating system, and further, it is possible to provide a plurality of compressed air generating devices each comprising a set of an oil cylinder and air cylinder when it is required to supply a further larger quantity of compressed air, e.g., when the mold volume is quite large.

Although an arrangement in which the air cylinder 16 and the oil cylinder 20 are disposed in coaxial relationship, and the two cylinders are associated with the pistons 17 and 21, respectively, interconnected by the rigid piston rod 25 through the partition wall 34 therebetween is shown in FIG. 1, it is not necessary that the air cylinder and the oil cylinder be coaxially arranged. Instead, the two cylinders may be arranged either in parallel or at right angles to each other in such a manner that they are mechanically coupled by means of any suitable mechanism such as levers and links in combination or the like so that oil pressure is operatively converted into air pressure. Furthermore, a returning motion of the oil piston 21 may be attained by using a suitable resilient means such as a compression spring.

The apparatus as described above by way of an example performs its forming operation on a sheet of thermoplastic resin in the following sequence.

In the initial step, the preheated sheet of thermoplastic resin 1 is fed into the forming station. When the feed of the sheet 1 is completed, a solenoid valve 46 (FIG. 2) is actuated to open to pass the working oil under pressure into the oil cylinder 20 through the oil pipe line 33a so that the piston 22 is urged toward the air cylinder 16.

The piston 17 is caused to move slidingly within the air cylinder 16 in the leftward direction as viewed in FIG. 1 so as to increase the air pressure within the air cylinder 16. The thrust of the piston 21, that is, the oil pressure passing through the oil piping 33a can be readily generated by means of a hydraulic pump 36 (FIG. 2) and a release valve 40 (FIG. 2), and the pistons 17 and 21 stop their correlated sliding motion at the point where the air pressure formed within the air cylinder 16 by the piston 17 and the oil pressure provided through the pipe line 33a against the piston 21 become balanced. At this moment, these pressures are not necessarily and absolutely the same. In this respect, it is to be understood that the term "balance" used herein means that the product of the compressed air pressure and the head surface area of the air piston coincides substantially with that of the given oil pressure and the head surface area of the oil piston, which relationship is attained by virtue of the cylinder arrangement according to the present invention as described above.

Subsequently, the clamping rod 9 causes the clamping plate 8 to be lowered toward a clamping position where the sheet 1 is clamped between the frame 3 and the air blowing plate 7. Upon completion of the clamping of the sheet 1, the valve for starting forming operation 26 is opened, and compressed air is introduced through the pipe line 30, the valve 27, the pipe line 31 and the air blowing holes 10 into the lower side of the sheet 1, whereby the sheet 1 is urged into the inside of the forming mold cavities into a desired shape. When the sheet 1 begins to be formed into a desired shape, there occurs a reduction of the air pressure within the air cylinder 16, but in order to compensate for the air pressure drop caused in the air cylinder, the release valve 40 operates to produce a constant pressure so that the piston 21 will be moved toward the air cylinder 16.

At this moment, concurrent making-up of the quantity of compressed air leaking out from between the air blowing plate 7 and the sheet 1 is carried out. By virtue of this particular air making-up arrangement whereby the air pressure is kept substantially in equilibrium with the oil pressure acting on the head surface of the piston 21, the pressure of the compressed air can be advantageously maintained at a substantially constant controlled level throughout all forming operation stages, i.e., from initiation of the forming stage through cooling of a formed product for hardening. The displacement volume of the air cylinder 16 is preferably designed to be two or more times the volume of a formed product with the piston 17 at a position of its stroke such as to provide an air pressure sufficient for the product forming operation.

For instance, when a product of a volume of 1000 cc. is to be formed with a pressure of 4 kg/cm$^2$-abs., the required total design volume of the air cylinder should be 8,000 cc. (i.e., $1,000 \times 2 \times 4 = 8,000$) or more.

When the product is finished to its desired shape through a forming stroke and is cooled off to be hardened to an extent free from any possible deformation, the valve 26 for starting the forming stroke is now closed, thus discharging remaining air from between the formed product and the air blowing plate. At this moment, as a result of the operation of the switching valve 46 in the oil pressure generating device, the oil under pressure acting through the oil pipe line 33b causes the piston 21 within the oil cylinder to be returned to its original position to be set ready for the following forming cycle. Subsequently, the mold is opened, and the formed product is released out of the mold and is transferred outwardly from the mold. Then the succeeding part of the preheated sheet 1 is fed into the mold in position of the following forming cycle.

The product is thereafter sent to a shearing station and a stamping station (not shown) where it is sheared and stamped to a desired final shape.

Referring now to FIG. 2, there are shown the compressed air generating device as described hereinbefore and hydraulic and pneumatic circuits wherein there is incorporated an example of a hydraulic system used in combination with the compressed air generating device of this invention, whereby a constantly controlled oil pressure is provided throughout the air-pressure forming operation.

As shown in FIG. 2, the working oil in an oil reservoir 45 is sucked by a pump 36 for generating an oil pressure through a filter 39, which pump is driven by a pump driving motor 37 directly coupled thereto through a shaft 38. The oil delivered by the pump 36 is then regulated at a predetermined pressure level by the function of the release valve 40. This oil pressure is detected by an oil pressure gage 42 through a plug cock 41 disposed in the line to the gage. A solenoid valve 43, which is adapted to operate when there is less load in the oil circuit, serves to reduce the load on the pump driving motor, this circuit being ordinarily called an unloading circuit.

The working oil pressurized by the oil pump 36 and controlled at a constant pressure level is directed through a check valve 44 and through a solenoid valve 46 actuated with a timing as set by a timer, whereby it is then introduced into the oil cylinder 20 through throttle-check valves 48 and 47 and the oil pipe lines 33a and 33b as the piston 22 is moved forwardly (for compressing air) and rearwardly (for introducing air into the air cylinder), respectively. The oil remaining on the side opposite to the working side of the piston and pressed out of the cylinder as the piston 22 is moved forwardly and rearwardly is then returned to the oil reservoir through the switching solenoid valve 46. There are also shown an oil cooler 49 for cooling the oil temperature generated by the oil pump, a coolant pipe line 50 connected to the oil cooler, and a check valve 51.

Any kind of thermoplastic resin material in the form of a sheet may be formed in the air-pressure forming apparatus of this invention provided that this material has properties which are suitable for ordinary pressure forming operation without any significant limits, i.e., which afford an appropriate expandability according to the shape required to be formed at a certain high temperature. Typical examples of such thermoplastic resin material are polystylene resins, polyvinyl chloride resins, methacrylic resind, polypropylene resins and polyethylene resins. Also, there is no substantial limitation to the thickness of the sheet material to be formed by the apparatus of the invention. Therefore, sheets of material in the thickness range applicable to the ordinary pressure forming operation, e.g., 0.13 to 1.0 mm, can be formed readily to a desired shape.

As for the shape to which the sheet material may be formed by the method of this invention, a relatively shallow shape, i.e., of a ratio of depth to width (shorter side) of 0.7 or less, is most preferable. However, by simply connecting the air exhaust outlet 6 in the mold support 4 to a suitable vacuum source as described hereinbefore, a shape of deeper depth may be formed as desired. In addition, this method may be applied in combination with the known plug-assist forming, and in this case, it is of course possible to form the material into a shape of even greater depth.

The improved method of and apparatus for pressure-forming of thermoplastic resin sheets according to this invention as described above afford the following advantageous features, which are of considerable value and utility in industrial applications.

1. It is possible to supply constant air pressure to the material during the whole pressure forming operation stage, whereby even the corners of the formed products can be formed precisely to the shape of the mold.
2. The air pressure supplied to a sheet material being formed can be readily adjusted at a desired constant level throughout the whole forming operation stage simply by regulating the oil pressure within the oil cylinder.
3. While it was difficult to pressure-form a product of a larger volume and area by the conventional methods of forming, the method of this invention can meet such requirement simply by increasing the number of air cylinders.
4. In contrast with the case of application of conventional means to produce a constant air pressure, the method of this invention affords a supply of compressed air of an appropriate quantity, neither more nor less, by using a unique compression system of an advantageously small capacity.

Although detailed description has been made herein exclusively on the foregoing typical embodiments of this invention, it should be understood, as indicated hereinbefore, that the preferred embodiments as described and shown herein do not mean in any way limitations of this invention, but on the contrary, many changes, variations, and modifications with respect to the construction and arrangement in practice thereof may further be derived by those skilled in the art to which the present invention pertains, whereby the advantageous characteristics of this invention may be materialized without departing from the spirit and scope of the invention.

What is claimed is:

1. In an apparatus for air-pressure forming of thermoplastic resin sheets comprising a set of mold means having a plurality of air purging holes and complementary means having a plurality of compressed air blowing holes and air compressing means for supplying air at a specific pressure to said compressed air blowing holes, said set of mold means and complementary means being disposed in mutually opposed state so adapted that at least one of said means can be moved toward and away from the other, the improvement wherein said air compressing means comprises compressed air generating cylinder means, first piston means movable slidably within said compressed air generating cylinder means, hydraulic cylinder means, and second piston means movable slidably in said hydraulic cylinder means, said first piston means being mechanically connected to and driven by said second piston means which is in turn operatively connected to means for generating a substantially constant hydraulic pressure.

2. The improvement as claimed in claim 1 wherein said compressed air generating cylinder means is coaxially and integrally connected to said hydraulic cylinder means through a partition wall therebetween, and said first piston means and said hydraulic piston means are connected to each other by a rigid piston rod extending through said partition wall.

3. The improvement as claimed in claim 1 wherein said compressed air generating cylinder means is operatively connected to said air purging holes in said complementary means by piping means including a valve for starting a forming operation and an exhaust valve, and wherein said hydraulic cylinder means is an oil pressure actuating cylinder, which is operatively connected to oil pressure generating means including a pump, a pump driving motor, a release valve, and a switching valve.

4. The improvement as claimed in claim 1 wherein said complementary means is in contact with a heating plate incorporating heating means therein.

5. The improvement as claimed in claim 1 wherein said compressed air generating cylinder means is disposed under said complementary means so that said cylinder is integral in construction with said complementary means through said heating plate and a fixing base of said apparatus interposed therebetween.

6. The improvement as claimed in claim 1 wherein said mold means define a mold cavity and the displacement volume of the first piston means within said compressed air generating cylinder means is greater than the volume of said mold cavity.

7. The improvement as claimed in claim 6 wherein said displacement volume is at least two times more than the volume of said mold cavity.

* * * * *